US006877272B2

(12) United States Patent
Hoshall

(10) Patent No.: US 6,877,272 B2
(45) Date of Patent: Apr. 12, 2005

(54) METHOD OF APPLYING PESTICIDE

(76) Inventor: Tom Hoshall, 7150 NW. 112th St., Oklahoma City, OK (US) 73162

( * ) Notice: Subject to any disclaimer, the term of this patent is extended or adjusted under 35 U.S.C. 154(b) by 2 days.

(21) Appl. No.: 10/411,461

(22) Filed: Apr. 10, 2003

(65) Prior Publication Data

US 2004/0200132 A1 Oct. 14, 2004

(51) Int. Cl.⁷ .............................................. A01M 1/20
(52) U.S. Cl. .......................... 43/132.1; 43/124; 52/101
(58) Field of Search ............................... 43/124, 132.1; 52/101, 169.1, 169.5; 239/547; 138/28, 118, 118.1, 119, 178

(56) References Cited

U.S. PATENT DOCUMENTS

| | | | |
|---|---|---|---|
| 2,059,095 A | 10/1936 | Fellman | 43/124 |
| 2,246,731 A | 6/1941 | Hill | 43/124 |
| 2,592,022 A | 4/1952 | Gallant | 43/131 |
| 2,842,892 A | 7/1958 | Aldridge et al. | 43/124 |
| 2,915,848 A | 12/1959 | Griffin | 43/124 |
| 2,981,025 A | 4/1961 | Woodson | 43/124 |
| RE25,080 E | 11/1961 | Griffin | 43/124 |
| 3,124,893 A | 3/1964 | Glenn | 43/124 |
| 3,151,746 A | 10/1964 | Reustle et al. | 43/124 |
| 3,209,485 A | 10/1965 | Griffin | 43/124 |
| 3,513,586 A | 5/1970 | Meyer et al. | 43/124 |
| 3,676,949 A | 7/1972 | Ramsey | 43/124 |
| 3,782,026 A | 1/1974 | Bridges et al. | 43/124 |
| 3,909,975 A | 10/1975 | Basile | 43/124 |
| 3,980,104 A | 9/1976 | Kabai | 138/103 |
| 4,003,408 A | 1/1977 | Turner | 138/118 |
| 4,016,727 A | 4/1977 | Osaka et al. | 61/11 |
| 4,028,841 A | 6/1977 | Lundwall | 43/124 |
| 4,077,571 A | 3/1978 | Harmony | 239/107 |
| 4,095,750 A | 6/1978 | Gilead | 239/542 |
| 4,139,159 A | 2/1979 | Inoue et al. | 239/547 |
| 4,181,051 A | 1/1980 | Drori | 83/19 |
| 4,254,916 A | 3/1981 | Havens et al. | 239/547 |
| 4,297,055 A | 10/1981 | Peacock | 405/184 |
| 4,517,316 A | 5/1985 | Mason | 521/81 |
| 4,615,642 A | 10/1986 | Mason | 405/45 |
| 4,625,474 A | 12/1986 | Peacock et al. | 52/101 |
| 4,726,520 A | 2/1988 | Brown et al. | 239/542 |
| 4,742,641 A | 5/1988 | Cretti | 43/132.1 |
| 4,798,034 A | 1/1989 | Jarnagin et al. | 52/169.5 |
| 4,800,672 A | 1/1989 | Jackson | 43/125 |
| 4,823,505 A | 4/1989 | Jackson | 43/124 |
| 4,858,521 A | 8/1989 | Heh | 98/42.05 |
| 4,885,984 A | 12/1989 | Franceus | 98/42.05 |
| 4,893,434 A | 1/1990 | Knipp et al. | 43/124 |
| 4,938,124 A | 7/1990 | Garza | 98/42.04 |
| 4,944,110 A | 7/1990 | Sims | 431/124 |
| 4,945,673 A | 8/1990 | Lavelle | 43/124 |

(Continued)

Primary Examiner—Darren W. Ark
(74) Attorney, Agent, or Firm—Dunlap, Codding & Rogers, P.C.

(57) ABSTRACT

A method for delivering a pesticide adjacent a foundation of a structure is provided. The method includes injecting the pesticide into a tubular conduit positioned proximate to the foundation of the structure. The pesticide is injected into the tubular conduit at a rate such that the internal pressure of the tubular conduit remains below a threshold pressure of the tubular conduit until the tubular conduit is substantially filled with the pesticide thereby preventing the pesticide from being discharged through pores of the tubular conduit as the tubular conduit is being filled with the pesticide. Continued injection of pesticide into the tubular conduit causes the tubular conduit to be uniformly pressurized above the threshold pressure of the tubular conduit along the length of the tubular conduit to cause the pesticide to be discharged from the tubular conduit at a substantially uniform rate along the length of the tubular conduit and form a chemical barrier against the infestation of pests into the structure through openings formed in the foundation of the structure.

12 Claims, 6 Drawing Sheets

U.S. PATENT DOCUMENTS

| | | | |
|---|---|---|---|
| 4,949,626 A | 8/1990 | Townsend et al. | 98/42.02 |
| 4,988,237 A | 1/1991 | Crawshaw | 405/229 |
| 4,995,309 A | 2/1991 | Weaver | 98/42.07 |
| 5,003,750 A | 4/1991 | Delgado | 52/742 |
| 5,007,197 A | 4/1991 | Barbett | 43/124 |
| 5,058,312 A | 10/1991 | Jackson | 43/125 |
| 5,063,706 A | 11/1991 | Aki et al. | 43/125 |
| 5,083,500 A | 1/1992 | Francis et al. | 454/341 |
| 5,101,712 A | 4/1992 | Dean, Jr. | 454/341 |
| 5,127,768 A | 7/1992 | Crawshaw et al. | 405/229 |
| 5,184,418 A | 2/1993 | Fletscher | 43/124 |
| 5,231,796 A | 8/1993 | Sims | 43/124 |
| 5,277,003 A | 1/1994 | Myers | 52/169.5 |
| 5,309,669 A | 5/1994 | Jackson | 43/124 |
| 5,317,831 A | 6/1994 | Fletscher | 43/124 |
| 5,347,749 A | 9/1994 | Chitwood et al. | 43/124 |
| 5,356,240 A | 10/1994 | Schuler | 405/229 |
| 5,359,806 A | 11/1994 | Jeffrey et al. | 43/131 |
| 5,361,533 A | 11/1994 | Pepper | 43/124 |
| 5,378,086 A | 1/1995 | Campbell, Jr. et al. | 405/229 |
| 5,390,440 A | 2/1995 | Mihealsick | 43/124 |
| 5,394,642 A | 3/1995 | Takaoka | 43/124 |
| 5,474,398 A | 12/1995 | Prassas et al. | 405/45 |
| 5,502,920 A | 4/1996 | Takaoka | 43/132.1 |
| 5,551,797 A | 9/1996 | Sanford | 405/36 |
| 5,620,143 A | 4/1997 | Delmer et al. | 239/542 |
| 5,689,921 A | 11/1997 | Carlton | 52/169.5 |
| 5,694,723 A | 12/1997 | Parker | 52/169.5 |
| 5,740,638 A | 4/1998 | Shepherd, III | 52/169.5 |
| 5,771,643 A | 6/1998 | Parker | 52/169.5 |
| 5,775,840 A | 7/1998 | Knieper et al. | 405/128 |
| 5,819,466 A | 10/1998 | Aesch et al. | 43/123 |
| 5,836,815 A | 11/1998 | Jennemann | 454/341 |
| 5,852,906 A | 12/1998 | Kuban | 52/302.1 |
| 5,881,494 A | 3/1999 | Jenkins | 43/124 |
| 5,931,603 A | 8/1999 | Swain et al. | 405/229 |
| 5,960,584 A | 10/1999 | Aesch, Jr. | 43/124 |
| 6,047,498 A | 4/2000 | Mann | 43/132.1 |
| 6,070,357 A | 6/2000 | Hartill et al. | 43/132.1 |
| 6,199,770 B1 | 3/2001 | King et al. | 43/124 |
| 6,279,275 B1 | 8/2001 | Sawyer | 52/169.5 |
| 6,397,518 B2 | 6/2002 | Mann | 43/132.1 |
| 6,446,383 B1 | 9/2002 | Hoshall | 43/124 |
| 6,564,504 B2 * | 5/2003 | Hoshall | 43/132.1 |
| 6,708,444 B2 * | 3/2004 | Aesch, Jr. | 43/132.1 |
| 6,782,655 B2 * | 8/2004 | Hoshall | 43/132.1 |

* cited by examiner

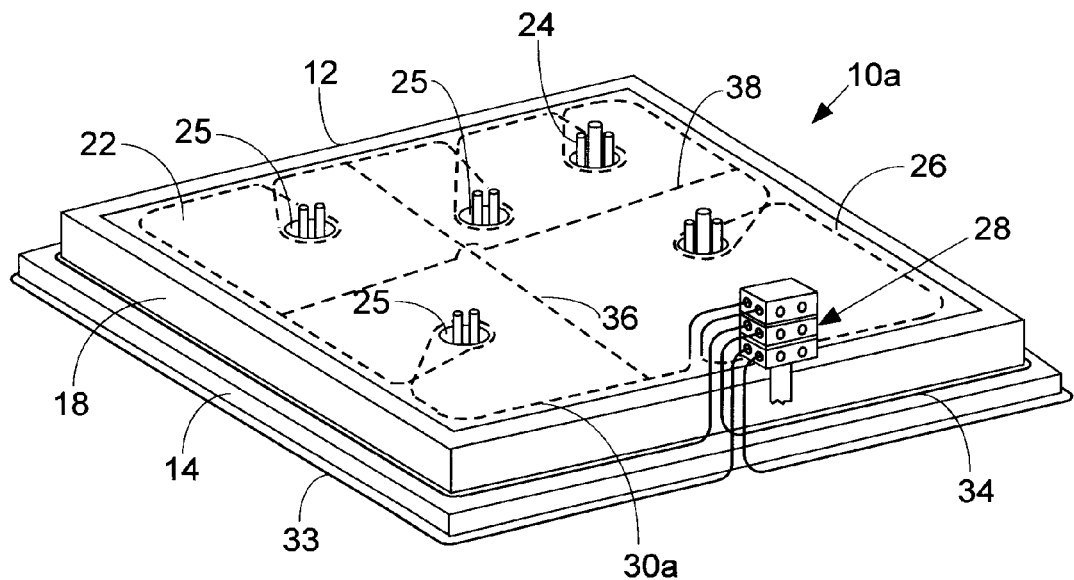
FIG. 1A
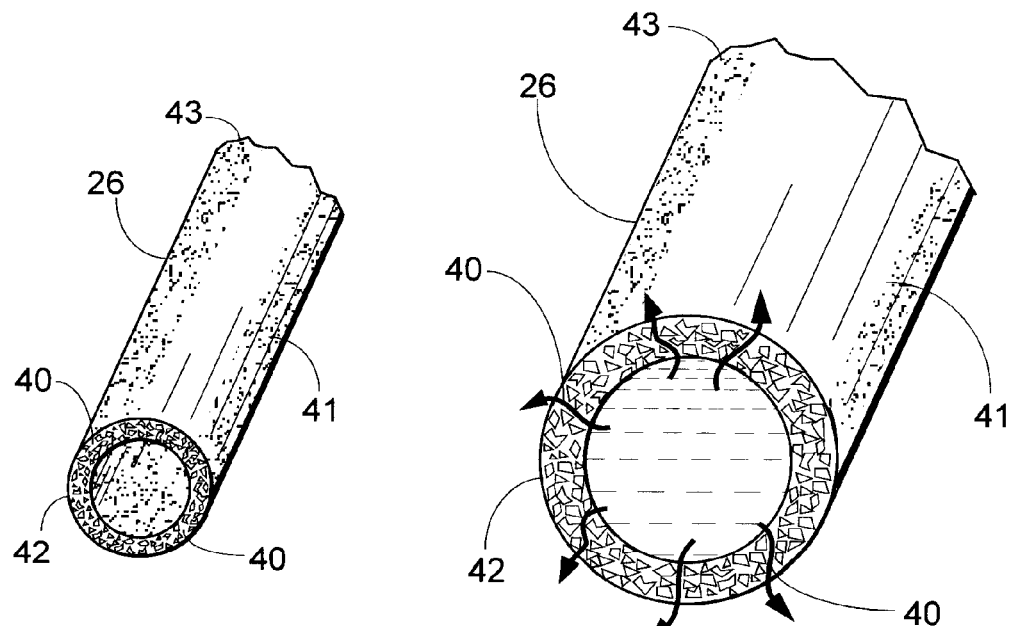
FIG. 3  FIG. 4

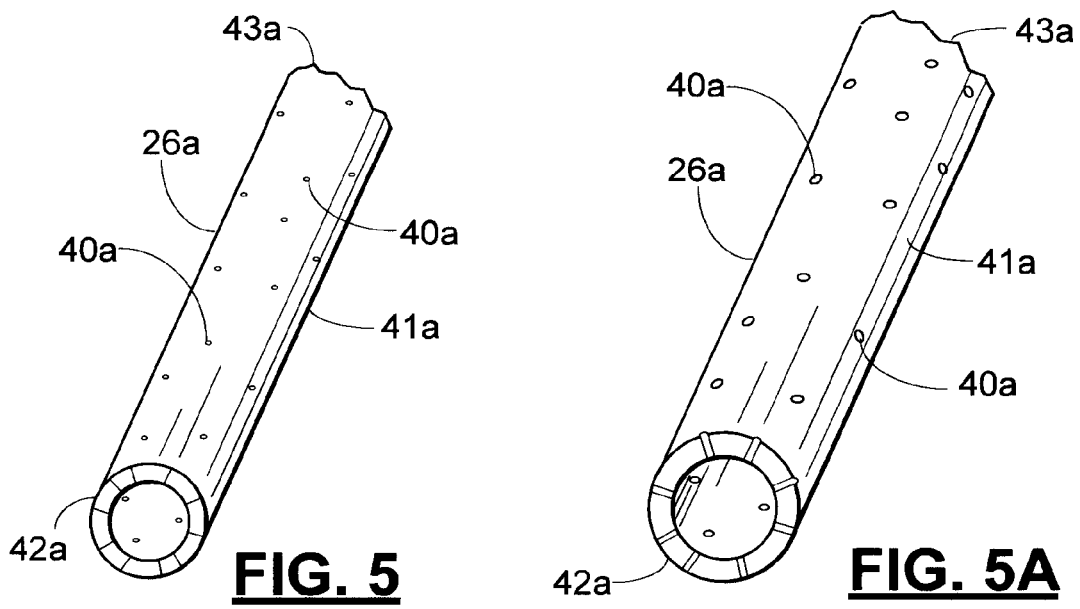
FIG. 5   FIG. 5A
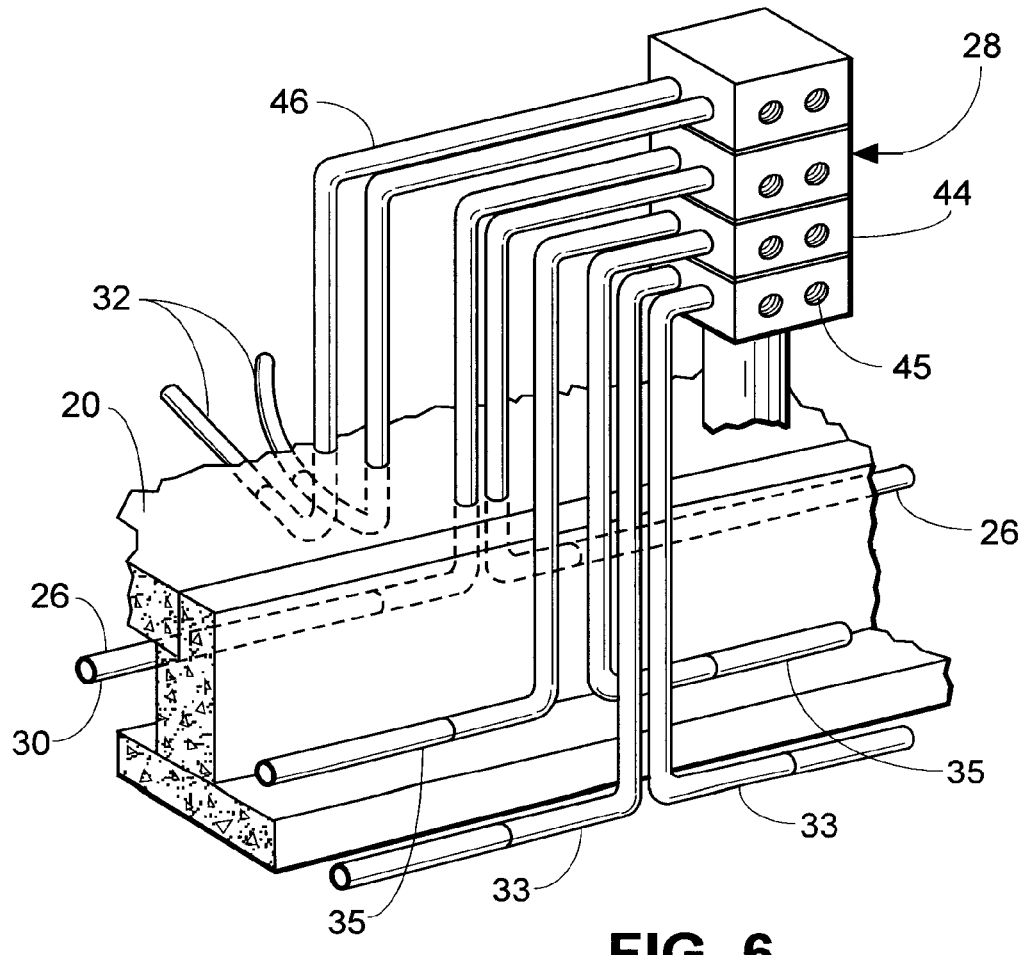
FIG. 6

METHOD OF APPLYING PESTICIDE

BACKGROUND OF THE INVENTION

1. Field of the Invention

The present invention relates generally to insect control systems for structures, and more particularly, but not by way of limitation, to an improved method for injecting pesticide beneath or inside a structure in a uniform manner.

2. Brief Description of the Related Art

Numerous systems have been proposed for protecting buildings and homes from damage caused by pests, such as subterranean termites, which can do considerable structural and cosmetic damage over time. A common practice for treating infestation of pests into a structure is to pre-treat the ground under the structure with pesticide chemicals during the construction process. This is done by applying a substantial quantity of pesticides, such as termiticide, on the ground under the proposed structure before the slab is poured in an attempt to create a chemical barrier that will keep the insects from entering the structure.

The problem with this method of treatment is the amount of pesticide required to be used can be harmful to occupants of the structure as well as harmful to the groundwater. Furthermore, even though a large amount of pesticide is applied to the ground, the resulting chemical barrier nevertheless becomes ineffective over time as the chemicals break down.

With these problems in mind, other methods have been developed for the periodic injection of pesticide beneath structures. One particular method involves the drilling of holes in and around the slab for the injection of pesticide. This method has many drawbacks which include affecting the integrity of the slab, the mess of drilling through the slab, convenience of having to clear a path around the structure to permit access for the drilling, the need for the holes to be plugged, and the residual odor of the pesticide that escapes during the injection process. In addition, this process must be periodically repeated during the lifetime of the structure.

Considerable efforts have been made to alleviate the problems of post construction periodic injection of pesticides beneath the structure by placing an injection system beneath the structure during the construction process. Many of these systems involve placing a network of porous tubing beneath the structure. The problem encountered in these systems however is that the holes provided in the tubing have a fixed diameter and thus are susceptible to clogging. Because there is a preference to placing the network of tubing within the fill material positioned under the slab, the fill material often obstructs or clogs the holes. The holes can also get clogged by dead insects and other pests that may enter the holes in the tubing over the course of the lifetime of the system. When the holes become clogged or obstructed, they fail to deliver pesticide to the surrounding location, thereby creating a gap in the chemical barrier which can be exploited by pests.

Other injection network systems with fixed holes have attempted to prevent hole obstruction elaborate systems or by varying construction procedures. For example, systems have been developed where the holes are sheltered with wick-like membranes, soil screens, shower-type sprinkler heads, and sponges. Other systems attempt to keep the holes from being obstructed by surrounding the holes with specialized fill materials applied during the construction process. Each of these types of systems is complex and increases installation costs.

Another problem that has been encountered with pesticide injection systems of the existing art is that each of these systems tend to inject pesticide at decreasing rates along the length of the tubing. This is due to the fixed holes of the tubing allowing pesticide to be injected at a greater rate near the injection end of the tubing while the injection rate decreases as the distance from the injection end increases. Consequently, pesticide is applied in a non-uniform fashion. If a pesticide is not capable of being applied in a uniform and predictable fashion, the application of such pesticide generally will not comply with the requirements of the pesticide label, as required by federal law. As such, a system that is not capable of applying pesticide in accordance with label requirements is rendered inoperable.

To this end, a need exists for a pesticide injection system which is simple in design, inexpensive to install, easy to operate and maintain, and which distributes pesticide uniformly throughout the system. It is to such a system that the present invention is directed.

BRIEF DESCRIPTION OF THE SEVERAL VIEWS OF THE DRAWINGS

FIG. 1A is a perspective view of a foundation of a dwelling with another embodiment of a subsurface pesticide injection system constructed in accordance with the present invention installed under the foundation.

FIG. 3 is a perspective view of a tubular conduit used with the subsurface pesticide injection system of the present invention.

FIG. 4 is a perspective view of the tubular conduit of FIG. 3 shown in an expanded condition for releasing fluid in accordance with the present invention.

FIG. 5 is a perspective view of another embodiment of an elastomeric conduit used with the subsurface pesticide injection of the present invention.

FIG. 5A is a perspective view of the tubular conduit of FIG. 5 shown in an expanded condition for releasing fluid in accordance with the present invention.

FIG. 6 is a partially cutaway, perspective view of a service panel of the subsurface pesticide injection of the present invention.

DETAILED DESCRIPTION OF THE INVENTION

Figure 1:
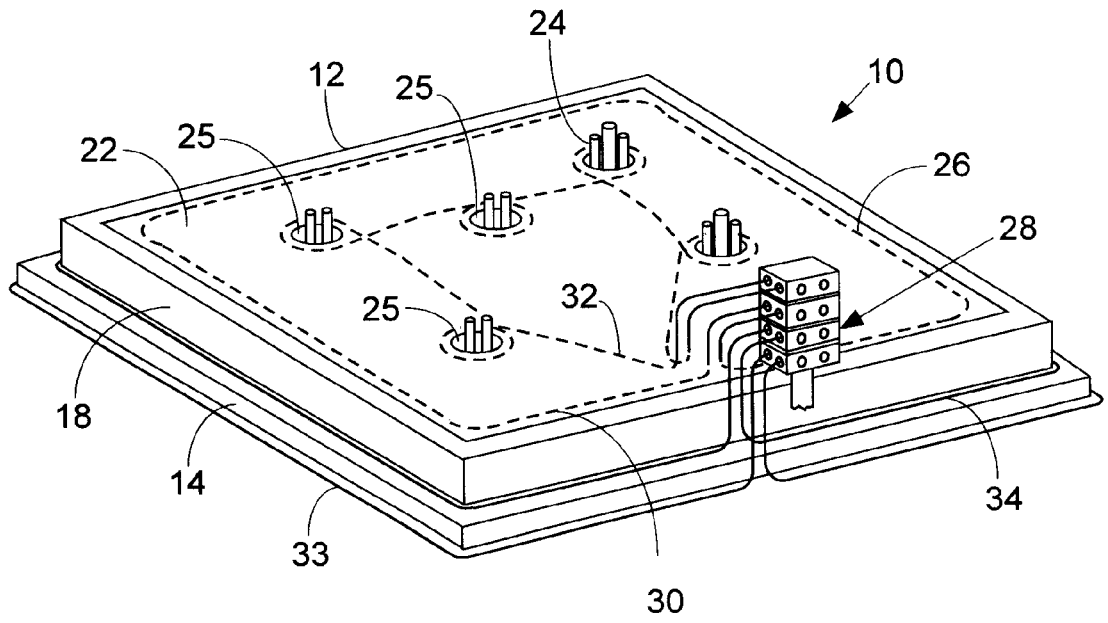
FIG. 1 is a perspective view of a foundation of a dwelling with a subsurface pesticide injection system constructed in accordance with the present invention installed under the foundation.
Figure 2:
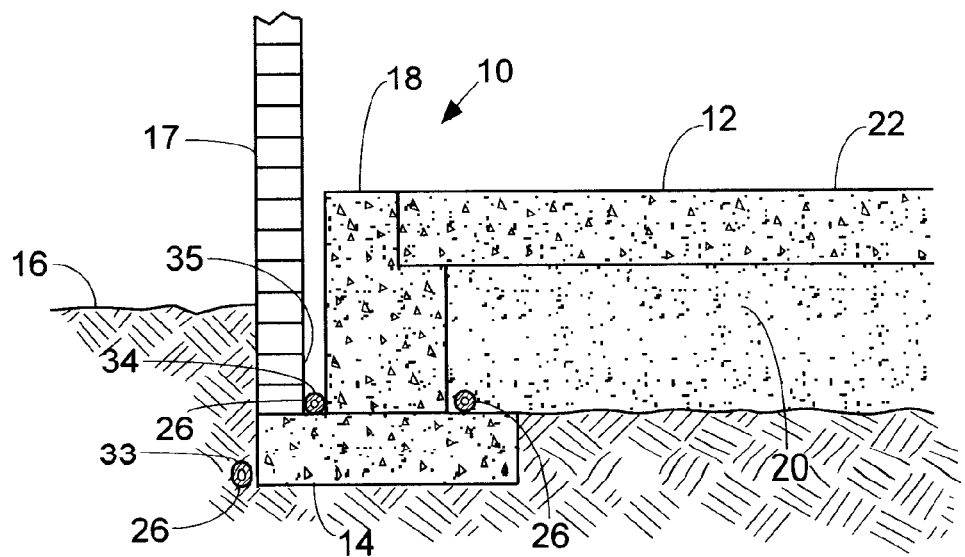
FIG. 2 is a cross-sectional view of a portion of the foundation illustrating the subsurface pesticide injection system of FIG. 1 installed under the foundation.

Referring now to the drawings and more particularly to FIGS. 1 and 2, a pesticide injection system 10 constructed in accordance with the present invention is shown installed beneath a foundation 12 of a structure. The foundation 12 has a footing 14 formed in a base soil 16 (FIG. 2). The footing 14 provides a support surface for an exterior facing 17, such as brick (FIG. 2), and a stem wall 18 which generally defines a perimeter of the structure. A fill material 20, such as sand or gravel, is disposed on the base soil 16 within the perimeter of the stem wall 18, and a concrete slab 22 is formed on the fill material 20. A plurality of plumbing pipes 24, which run through the fill material 20, protrude up through the concrete slab 22.

Upon curing of the concrete slab 22, openings or cracks typically form between the stem wall 18 and concrete slab 22, as well as between the plumbing pipes 24 and the concrete slab 22, such as openings 25. These openings and cracks provide an entry point into the structure for pests and fluids. Consequently, the area near the perimeter of the concrete slab 22 and the area adjacent where the plumbing pipes 24 protrude up through the concrete slab 22 require periodic attention to prevent pest infestation and accumulation of harmful fluids in the structure.

The pesticide injection system 10 includes one or more circuits of a tubular conduit 26 positioned under the foundation 12 of the structure and a connector assembly 28 which permits a source of pressurized pesticide to be connected to the tubular conduits 26. As such, pesticide may be selectively injected into the fill material 20 in an injection mode to form a chemical barrier against the infestation of pests into the structure through the openings 25 of the concrete slab 22.

FIGS. 1 and 2 illustrate the pesticide injection system 10 having a circuit 30 which is positioned adjacent to the perimeter of the concrete slab 22 and a circuit 32 which is positioned to loop in close proximity to the upward extending plumbing pipes 24. The pesticide injection system 10 is also illustrated having a circuit 33 extending around the perimeter of the structure on the exterior side of the footing 14 and a circuit 34 positioned in a space 35 formed between the exterior facing 17 and the stem wall 18.

FIG. 1A shows another embodiment of a pesticide injection system 10a. The pesticide injection system 10a includes a circuit 30a positioned under the foundation 12 of the structure. The circuit 30a is provided with cross members 36 and 37. The cross members 36 and 37 have the effect of making the circuit 30a a parallel flow circuit. A parallel flow circuit provides multiple flow paths to any particular point in the flow circuit. This is an advantage because if one particular segment of the circuit 30a becomes crimped or otherwise clogged, pesticide will still be applied to portions of the circuit 30a on either side of the blockage. Furthermore, a parallel flow circuit generally has less of a pressure drop between the flow entrance and any point in the system, as compared with a series flow circuit. This results in a more uniform distribution of the pesticide from the tubular conduit 26.

It will be appreciated by those of ordinary skill in the art that the tubular conduit 26 may be positioned in a variety of different locations. For example, it may be desirable to place the tubular conduit 26 in the upper portion of the fill material 20, as opposed to the lower portion of the fill material 20. In addition, the tubular conduit 26 can be positioned along the lower end of an insulation material 38 (FIG. 11) fixed to an interior side of the stem wall 18 to prevent pests from migrating between the insulation material 38 and the stem wall 18. In another instance, it may be desirable to place the tubular conduit 26 at the perimeter of the stem Wall 18 such that the tubular conduit 26 is positioned in the concrete slab 22 so as to be in the path of where cracks are likely to form between the stem wall 18 and the concrete slab 22. Prior to forming the concrete slab 22, the tubular conduit 26 may be secured to the stem wall 18 with a suitable adhesive.

FIGS. 3 and 4 illustrate the tubular conduit 26. The tubular conduit 26 is formed of particles of vulcanized rubber dispersed in a binder resin such that tortuous pores or channels 40 are formed in the side wall. Examples of suitable conduits are disclosed in U.S. Pat. No. 4,003,408, assigned to George C. Ballas, trustee, and U.S. Pat. No. 5,474,398, assigned to Aquapore Moisture Systems, Inc. of Phoenix, Ariz., both of which are hereby expressly incorporated herein.

The tubular conduit 26 is generally tubular and has a sidewall 41, a first end 42, a second end 43. The sidewall 41 has a thickness sufficient to give the tubular conduit 26 structural integrity to prevent collapse of the tubular conduit 26 due to soil loading pressures. The sidewall 41 is also of such thickness so that the tubular conduit 26 maintains a high degree of flexibility along it length to facilitate installation.

The tubular conduit 26 has a substantially circular cross-sectional configuration and is constructed of an elastomeric material such that upon loading the tubular conduit 26 with pesticide and applying a positive internal pressure to the tubular conduit 26 by the injection of additional pesticide into the tubular conduit 26 at a pressure at or above a threshold pressure of the tubular conduit 26, the sidewall 41 expands slightly causing the tortuous pores 40 of the tubular conduit 26 to open and permit pesticide to drip through the tortuous pores 40 into the fill material 20 in the injection mode while the tubular conduit 26 maintains its substantially circular cross-sectional configuration. Finally, upon removal of the positive internal pressure, the tortuous pores 40 are caused to close so that the tortuous pores 40 remain substantially clog free while the tubular conduit 26 maintains its substantially circular cross-sectional configuration.

The threshold pressure of the tubular conduit 26 is the pressure required to open the pores 40 to allow for the release of pesticide. It should be appreciated that the threshold pressure will vary depending on the physical characteristics of the tubular conduit 26 and the environmental conditions. However, by way of example, a tubular conduit having an outer diameter of 0.71 inches and an inner diameter of 0.53 inches will generally have a threshold pressure in a range of from about 2 psi to about 10 psi.

FIGS. 5 and 5A illustrate another embodiment of a tubular conduit 26a that can be used in the pesticide injection system 10 of the present invention. Like the tubular conduit 26, the tubular conduit 26a is generally tubular and has a sidewall 41a, a first end 42a, a second end 43a, and a plurality of small, straight pores 40a extending through the sidewall 41 from the first end 42 to the second end 43. The tubular conduit 26 has a substantially circular cross-sectional configuration and is constructed of an elastomeric material, such as rubber, neoprene, or plastic, so that upon loading the tubular conduit 26a with pesticide and applying a positive internal pressure to the tubular conduit 26a by the injection of additional pesticide into the tubular conduit 26a at a pressure at or above a threshold pressure of the tubular conduit 26a, the sidewall 41a expands slightly causing the tubular conduit 26 to expand and open the pores 40a and permit pesticide to drip through the pores 40a into the fill material 20 in the injection mode while the tubular conduit 26a maintains its substantially circular cross-sectional configuration. Finally, upon removal of the positive internal pressure, the pores 40a are caused to close so that the pores 40a remain substantially clog free while the tubular conduit 26a maintains its substantially circular cross-sectional configuration. It should be appreciated that the pores 40a may also be in the form of slits.

The threshold pressure of the tubular conduit 26a is the pressure required to open the pores 40a to allow for the release of pesticide. It should be appreciated that the threshold pressure will vary depending on the physical characteristics of the tubular conduit 26a and the environmental conditions.

As illustrated in FIG. 6, the connector assembly 28 includes an access box 44 having a plurality of access ports or female connector members 45 (only one of the access ports being designated in FIG. 6) and a plurality of nonporous tubular conduits 46 (only one of the nonporous tubular conduits being designated in FIG. 6) for establishing fluid communication between the access ports 45 and the porous conduits 26. The nonporous tubular conduits 46 are preferably constructed of a relatively flexible material, such as polyethylene. The access box 44 includes access ports 45 for each end of the tubular conduit 26 for each circuit 30, 32, 33, and 34. Each nonporous tubular conduit 46 is disposed in one end of a corresponding tubular conduit 26 and the tubular conduit 26 is secured thereto with a suitable device, such as a hose clamp (not shown).

Each access port 45 is adapted to receive a source of pressurized pesticide whereby the pesticide may be selectively injected into the fill material 20 in an injection mode via the tubular conduits 26 to form a chemical barrier against the infestation of pests into the structure through the openings 25 of the concrete slab 22. A source of pressurized pesticide may be attached to each of the access ports 45 or to only one of the access ports 45. If the source of pressurized pesticide is connected to only one of the access ports 45, the other access port 45 is plugged with a cap 58.

The access ports 45 are illustrated as being configured for threaded attachment with the source of pressurized pesticide and the vacuum source. The access box 44 can be located in any convenient location such as on a wall of a garage, in a utility closet, or on an exterior wall of the structure.

Figure 7:
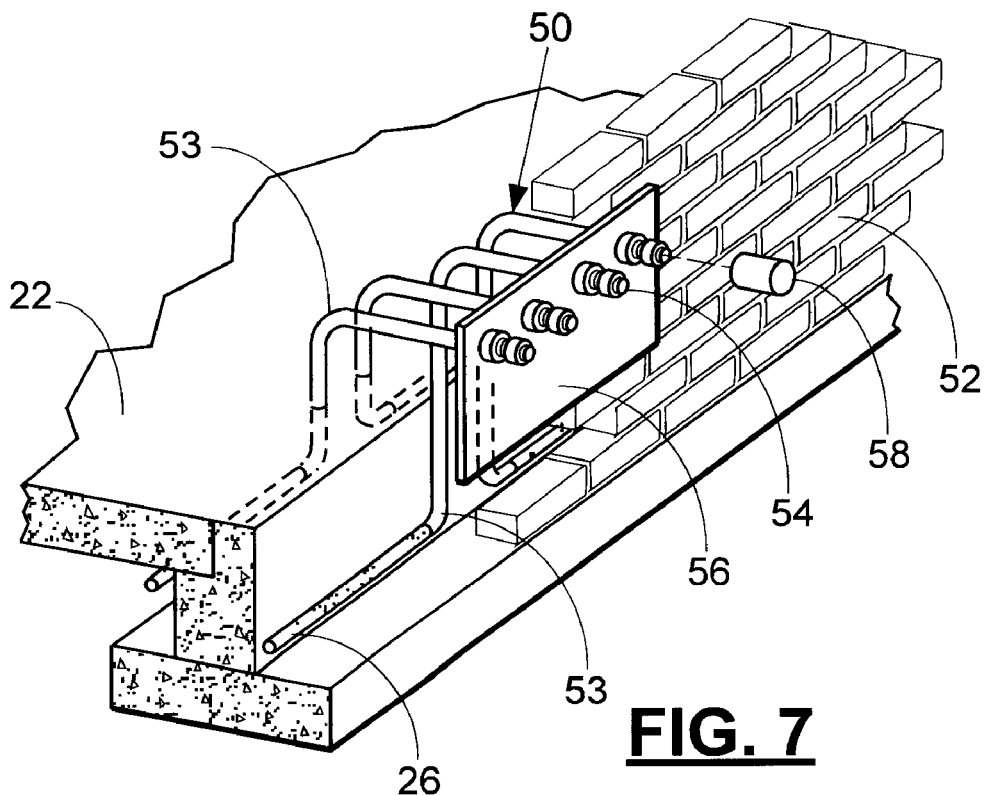
FIG. 7 is a perspective view of another embodiment of a service panel of the subsurface pesticide injection system of the present invention.

FIG. 7 illustrates another embodiment of a connector assembly 50 shown mounted to an exterior wall 52 of a structure. Like the connector assembly 28, the connector assembly 50 includes a plurality of nonporous tubular conduits 53. Each nonporous tubular conduit 53 of the connector assembly 50 is provided with a male connector member 54 rather than a female connector member as with the connector assembly 28. The male connector members 54 are shown to extend from the exterior wall 52 and to be supported by a support plate 56.

Each male connector 54 is adapted to receive a source of pressurized pesticide whereby the pesticide may be selectively injected into the fill material 20 in an injection mode via the tubular conduits 26 to form a chemical barrier against the infestation of pests into the structure through the openings 25 of the concrete slab 22. A source of pressurized pesticide may be attached to each of the male connector members 54, whereby pesticide is simultaneously injected into both ends of the tubular conduit 26, or to only one of the male connectors 54. If the source of pressurized pesticide is connected to only one of the male connectors 54, the other male connector 54 is preferably plugged with a cap 58 or other suitable device.

Like the access box 44 of the connector assembly 28, the male connector members 54 can also be located in any other convenient location such as on a wall of a garage or in a utility closet.

Figure 8:
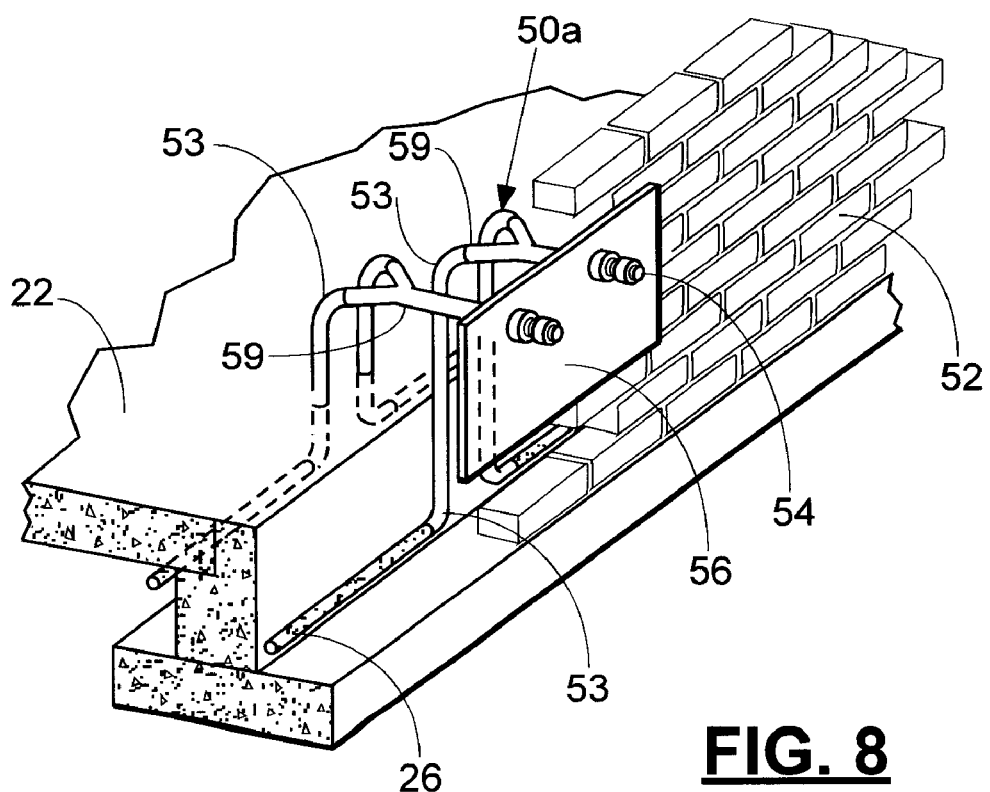
FIG. 8 is a perspective view of yet another embodiment of a service panel of the subsurface pesticide injection of the present invention.

FIG. 8 illustrates a connector assembly 50a which is similar to the connector assembly 50 described above with the exception that a Y-connector 59 is attached to the ends of each corresponding nonporous tubular conduit 53 to provide a single point of injection for each circuit (not shown in FIG. 8). Injection of pesticide is made via the male connector members 54. Use of the Y-connector 59 permits pesticide to be simultaneously injected through both ends of the tubular conduit 26 in the injection mode.

Figure 9:
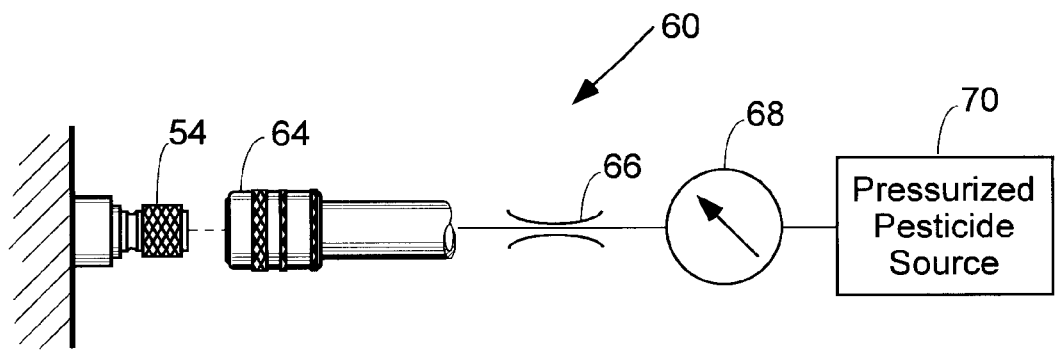
FIG. 9 is a partially schematic, side elevational view of an injector assembly for use with the pesticide injection system of the present invention.

Referring now to FIG. 9, an injection assembly 60 for use in injecting pesticide in the injection mode is shown. The injection assembly 60 includes an adapter hose 64 for connection with a connector member (shown as the connector member 54 in FIG. 9), a flow regulator 66, and a flow meter 68, and a source of pressurized pesticide 70.

The flow regulator 66 functions to restrict the flow of pesticide into the tubular conduit 26 so that the tubular conduit 26 is first filled or loaded with pesticide while maintaining the pressure on the tubular conduit 26 below its threshold pressure. Upon the tubular conduit 26 being loaded with pesticide, the continued injection of pesticide into the tubular conduit 26 pressurizes the tubular conduit 26 above its threshold pressure along its entire length, thereby causing the simultaneous opening of the pores 40 and the substantially uniform distribution of pesticide from the tubular conduit 26 along its entire length. Desirable results have been achieved by restricting the flow of pesticide into the tubular conduit 26 to 1 gal/min. However, it will appreciated that the flow rate can be varied depending on the characteristics of the tubular conduit 26.

The source of pressurized pesticide 70 may include a truck mounted tank and pump rig. The tank may be supplied with a predetermined amount of pesticide, or the flow meter 68 may be used to determine when the desired amount of pesticide has been injected. The amount of pressure required to effectively inject the pesticide into the fill material 20 and into the base soil 16 will vary depending on the density of the fill material 20 and the base soil 16. However, a pressure range of from about 2 psi to about 80 psi is generally suitable.

It will be appreciated that there are a variety of pesticides that are commercially available and which may be utilized with the pesticide injection system 10. In addition, it should be understood that pesticide may also be hot water which is known to control certain pests. A preferred temperature range for the water is from about 90 degrees Fahrenheit to about 180 degrees Fahrenheit. However, water temperatures as low as about 60 degrees may be effective in controlling certain types of pests.

Figure 10:
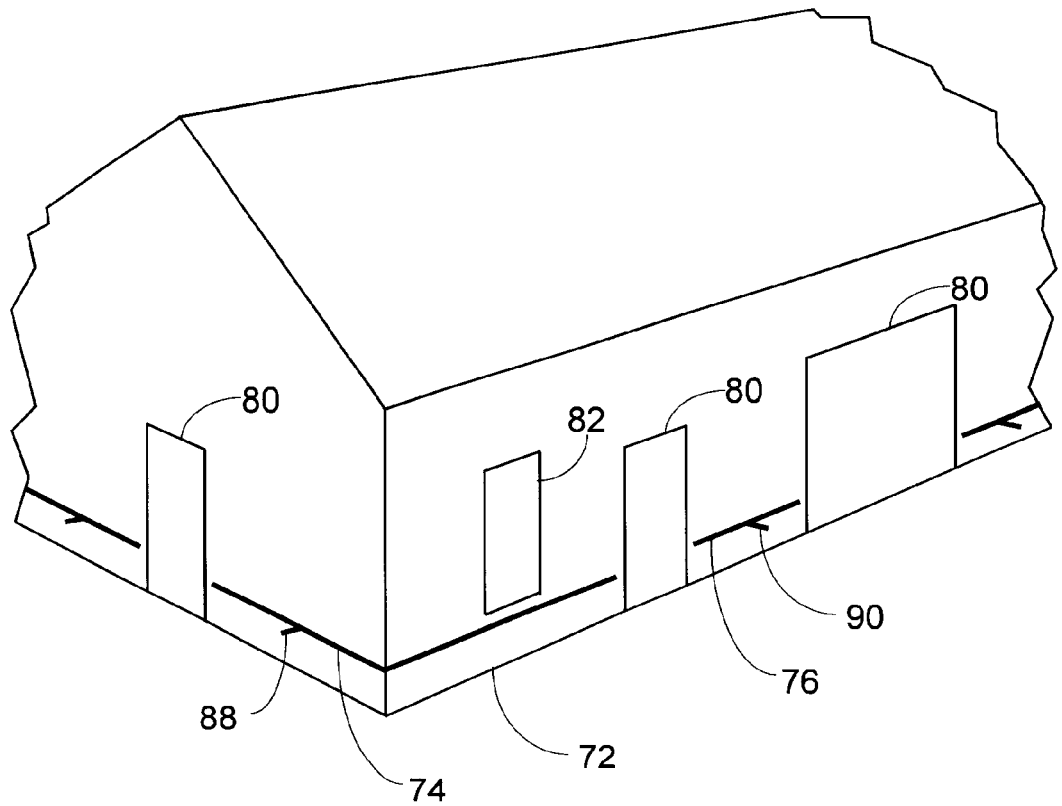
FIG. 10 a perspective view of another embodiment of a pesticide injection system constructed in accordance with the present invention shown installed in a structure.
Figure 11:
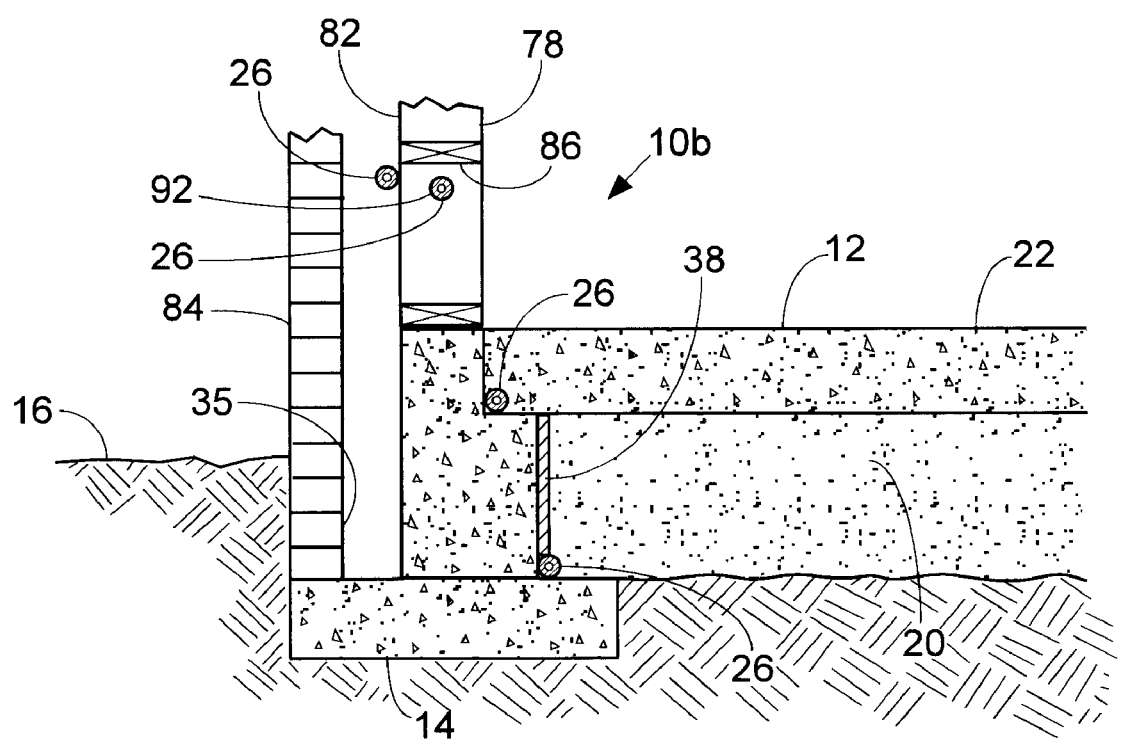
FIG. 11 is a cross-sectional view of a portion of the structure of FIG. 10 illustrating the pesticide injection system of FIG. 10

FIGS. 10 and 11 illustrate another embodiment of a pesticide injection system 10b installed in a structure 72. The pesticide injection system 10 includes a plurality of circuits, such as circuits 74 and 76. A location of the structure 72 vulnerable to insect damage is at a lower part of an exterior wall 78. While a gasket (not shown) is typically positioned the bottom of the exterior wall 78 and the top of the stem wall 18, gaps and channels nevertheless often exists between the bottom of the exterior wall 78 the stem wall 18. Consequently, moist air from inside the structure is caused to pass from the structure 72 through the gaps and channels as a result of pressure changes within the structure 72, such as when a door is opened or closed. The moist air in turn condenses on the cooler exterior surface of the exterior wall 78, thereby resulting in the growth of mold and mildew and creating an attractant for pests.

As shown in FIG. 10, the structure 72 includes a plurality of passageways, such doors 80 and window 82. The circuits 74 and 76 are positioned in the space 35 between an exterior facing 64 and the exterior wall 78 above the level of the concrete slab 22 and the stem wall 18 but below a bottom 86 of the lowest window of the structure 72. Each circuit 74 and 76 extends between doors 80 along the perimeter of the structure 72. Each circuit 74 and 76 terminates at one of the doors 80, as opposed to running above the doors 124 so that the tubular conduit 26 is maintained in a substantially horizontal orientation along is length to allow for uniform distribution of the pesticide. Each circuit 74 and 76 has an access port 88 and 90, respectively, for injecting pesticide. When an exterior facing is utilized that does not result in the formation of the space 35, the tubular conduit 26 of the circuits 74 and 76 is preferably positioned near the bottom of the exterior wall 78.

As further shown in FIG. 11, another series of circuits 91 may be positioned within the exterior wall 78.

Disodium octoborate tetrahydrate (referred to herein as a borate salt) as been found to be a suitable pesticide and fungicide to use with the circuits 74 and 76. The borate salt forms a hard crust upon drying. When the borate salt is applied through the tubular conduits 26 shown in FIG. 11, the borate salts seep from the tubular conduit 26 for several days. The borate salt that seeps from the tubular conduit 26 forms a crust on the exterior side of the exterior wall 78. This crust forms a barrier to prevent air and pests from passing through the gaps and channels of the exterior wall 78.

By loading the tubular conduit 26 with pesticide prior to pressurizing the tubular conduit 26, a substantially even flow of pesticide is admitted over the length of the tubular conduit 26. With respect to circuits of the present invention positioned within the fill material 20, such as the circuit 30 shown in FIG. 1A, it has been found that use of the pesticide injection system 10a will result in a continuous band of wet soil of approximately three inches on each side of the tubular conduit 26. As such, by way of example, if it is assumed the circuit 30a is 500 feet in length and the inner diameter of the tubular conduit 26 is 0.53 inches, the volume of the circuit 30a would be approximately 5.7 gallons. The area to be treated would be 500 feet times six inches (0.5 feet) or 250 square feet. Assuming the use of a pesticide that instructs the application of 1 gallon of solution per 10 square feet, it is determined that approximately 25 gallons of pesticide are required to be uniformly ejected along the length of circuit 30a.

In use, 5.7 gallons would be loaded into the tubular conduit 26 at 1 gallon per minute. Subsequent injection of pesticide into the tubular conduit 26 causes the tubular conduit 26 to be pressurized. Upon the tubular conduit 26 being pressurized to its threshold pressure, the pores 40 of the tubular conduit 26 are caused to open and begin releasing pesticide. The pesticide is injected into the pesticide injection system 10a until the measured amount of 25 gallons of pesticide has been injected. Upon the 25 gallons having been injected, the tubular conduit 26 will depressurize below its threshold pressure. As such, the pores 40 of the tubular conduit 26 will close even though approximately 5.7 gallons of pesticide may remain in the tubular conduit 26. However, it has been found that fluid in the tubular conduit 26 seeps from the pores 40 of the tubular conduit 26 over a period of time thereby resulting in the application of the measured amount of pesticide along the length of the tubular conduit 26.

With respect to calculating the amount of pesticide required to treat the circuits 74 and 75 shown in FIGS. 10 and 11, the wall surface area to be treated is calculated based on the length of the circuits 74 and 76 and the height that the tubular conduit 26 is positioned above the top of the stem wall 18. By way of example, if it is assumed the circuit 74 is located 9 inches above the top of the stem wall 18, the circuit 74 is 75 feet in length, and the inner diameter of the tubular conduit 26 is 0.53 inches, the volume of the circuit 74 would be approximately 0.84 gallons. The area to be treated would be 75 feet times 9 inches (0.75 feet) or 56.3 square feet. Assuming the use of a pesticide that instructs the application of 1 gallon of solution per 10 square feet, it is determined that approximately 5.6 gallons of pesticide are required to be uniformly ejected along the length of circuit 76.

In use, 0.84 gallons would be loaded into the tubular conduit 26 at 1 gallon per minute. Subsequent injection of pesticide into the tubular conduit 26 causes the tubular conduit 26 to be pressurized. Upon the tubular conduit 26 being pressurized to its threshold pressure, the pores 40 of the tubular conduit 26 are caused to open and begin releasing pesticide. The pesticide is injected into the circuit 74 until the measured amount of 5.6 gallons of pesticide has been injected. Upon the 5.6 gallons having been injected, the tubular conduit 26 will depressurize below its threshold pressure. As such, the pores 40 of the tubular conduit 26 will close even though approximately 0.84 gallons of pesticide may remain in the tubular conduit 26. However, it has been found that fluid in the tubular conduit 26 seeps from the pores 40 of the tubular conduit 26 over a period of time thereby resulting in the application of the measured amount of pesticide along the length of the tubular conduit 26.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for delivering a pesticide in a structure having an exterior facing, the method comprising:

injecting the pesticide into a tubular conduit positioned adjacent an interior side of the exterior facing of the structure, the tubular conduit having a sidewall, a first end, a second end, and a plurality of pores extending through the sidewall of the tubular conduit, the tubular conduit constructed of an elastomeric material such that upon applying a positive internal pressure to the tubular conduit above a threshold pressure the pores of the tubular conduit are caused to open to permit the discharge of pesticide from the tubular conduit and upon removal of the positive internal pressure so that the internal pressure is below the threshold pressure the pores are caused to close, the pesticide being injected into the tubular conduit at a rate such that the internal pressure of the tubular conduit remains below the threshold pressure of the tubular conduit until the tubular conduit is substantially filled with the pesticide thereby preventing the pesticide from being discharged through the pores of the tubular conduit as the tubular conduit is being filled with the pesticide; and continuing to inject the pesticide into the tubular conduit so as to cause the tubular conduit to be uniformly pressurized above the threshold pressure of the tubular conduit along the length of the tubular conduit to cause the pesticide to be discharged from the tubular conduit at a substantially uniform rate along the length of the tubular conduit and form a chemical barrier against the infestation of pests into the structure.

2. The method of claim 1 wherein the pesticide is injected into the tubular conduit at a rate of approximately 1 gal/min.

3. The method of claim 1 further comprising:
determining an amount of pesticide needed to treat a predetermined area bordered by the tubular conduit; and
injecting the determined amount of pesticide into the tubular conduit.

4. The method of claim 1 wherein the structure is provided with at least one window and a foundation, and wherein the tubular conduit is positioned between the bottom of the window and the top of the foundation.

5. The method of claim 4 wherein the pesticide comprises disodium octoborate tetrahydrate.

6. The method of claim 5 wherein the pesticide crystalizes in the area between the bottom of the window and the top of the foundation to form a physical barrier against the infestation of pests into the structure.

7. A method for delivering a pesticide adjacent a foundation of a structure, the method comprising:
injecting the pesticide into a tubular conduit positioned proximate to the foundation of the structure, the tubular conduit having a sidewall, a first end, a second end, and a plurality of tortuous pores extending through the sidewall of the tubular conduit, the tubular conduit constructed of an elastomeric material such that upon applying a positive internal pressure to the tubular conduit above a threshold pressure the pores of the tubular conduit are caused to open to permit the discharge of pesticide from the tubular conduit and upon removal of the positive internal pressure so that the internal pressure is below the threshold pressure the pores are caused to close, the pesticide being injected into the tubular conduit at a rate such that the internal pressure of the tubular conduit remains below the threshold pressure of the tubular conduit until the tubular conduit is substantially filled with the pesticide thereby preventing the pesticide from being discharged through the pores of the tubular conduit as the tubular conduit is being filled with the pesticide; and
continuing to inject the pesticide into the tubular conduit so as to cause the tubular conduit to be uniformly pressurized above the threshold pressure of the tubular conduit along the length of the tubular conduit to cause the pesticide to be discharged from the tubular conduit at a substantially uniform rate along the length of the tubular conduit and form a chemical barrier against the infestation of pests into the structure through openings formed in the foundation of the structure.

8. The method of claim 7 wherein the pesticide is injected into the tubular conduit at a rate of approximately 1 gal/min.

9. The method of claim 7 further comprising:
determining an amount of pesticide needed to treat a predetermined area bordered by the tubular conduit; and
injecting the determined amount of pesticide into the tubular conduit.

10. A method for delivering a pesticide beneath a structure having a footing formed in a base soil, a stem wall formed on the footing and defining a perimeter of the structure, a fill material disposed on the base soil within the perimeter of the stem wall, and a concrete slab formed on the fill material and having openings extending therethrough, the method comprising:
injecting the pesticide into a tubular conduit positioned proximate the openings of the concrete slab, the tubular conduit having a sidewall, a first end, a second end, and a plurality of tortuous pores extending through the sidewall of the tubular conduit, the tubular conduit constructed of an elastomeric material such that upon applying a positive internal pressure to the tubular conduit above a threshold pressure the pores of the tubular conduit are caused to open to permit the discharge of pesticide from the tubular conduit and upon removal of the positive internal pressure so that the internal pressure is below the threshold pressure the pores are caused to close, the pesticide being injected into the tubular conduit at a rate such that the internal pressure of the tubular conduit remains below the threshold pressure of the tubular conduit until the tubular conduit is substantially filled with the pesticide thereby preventing the pesticide from being discharged through the pores of the tubular conduit as the tubular conduit is being filled with the pesticide; and
continuing to inject the pesticide into the tubular conduit so as to cause the tubular conduit to be uniformly pressurized above the threshold pressure of the tubular conduit along the length of the tubular conduit to cause the pesticide to be discharged from the tubular conduit at a substantially uniform rate along the length of the tubular conduit and form a chemical barrier against the infestation of pests into the structure through the openings of the concrete slab.

11. The method of claim 10 wherein the pesticide is injected into the tubular conduit at a rate of approximately 1 gal/min.

12. The method of claim 10 further comprising:
determining an amount of pesticide needed to treat a predetermined area bordered by the tubular conduit; and
injecting the determined amount of pesticide into the tubular conduit.

* * * * *

UNITED STATES PATENT AND TRADEMARK OFFICE
CERTIFICATE OF CORRECTION

| | | |
|---|---|---|
| PATENT NO. | : 6,877,272 B2 | Page 1 of 1 |
| APPLICATION NO. | : 10/411461 | |
| DATED | : April 12, 2005 | |
| INVENTOR(S) | : Tom Hoshall | |

It is certified that error appears in the above-identified patent and that said Letters Patent is hereby corrected as shown below:

Column 3, line 67, after the word "stem" and before the number "18" delete "Wall" and replace with the --wall--.

Column 8, lines 47 after the word "of" and before the word "pores" add the word --tortuous--.

Signed and Sealed this

Fourteenth Day of November, 2006

JON W. DUDAS
*Director of the United States Patent and Trademark Office*